June 2, 1931.  C. COPPOCK  1,808,293
RAKE ATTACHMENT FOR HOES
Filed June 25, 1929
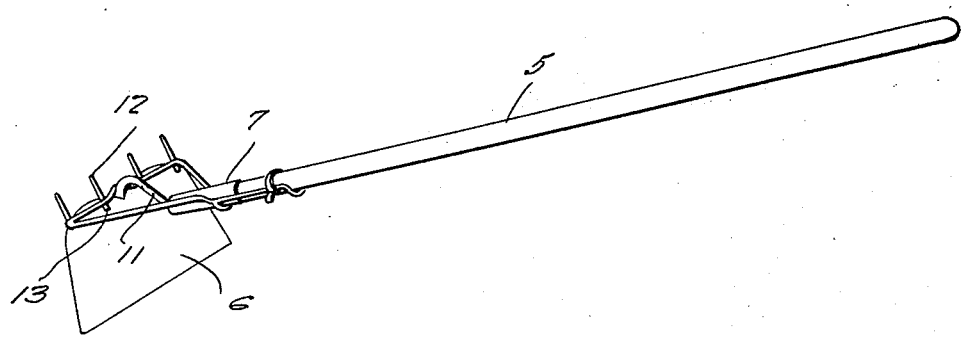
Fig. 1.
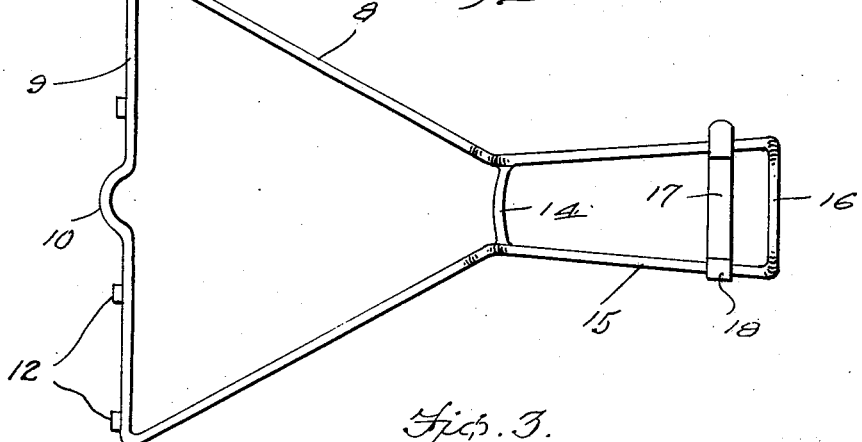
Fig. 2.
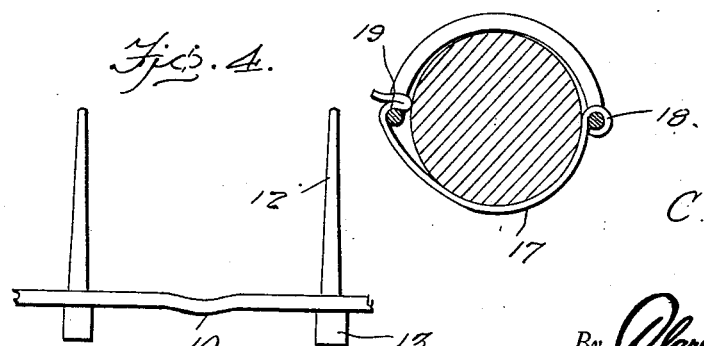
Fig. 3.
Fig. 4.
Inventor
C. Coppock
By Clarence A. O'Brien
Attorney Patented June 2, 1931

1,808,293

UNITED STATES PATENT OFFICE

CHARLES COPPOCK, OF GOLD HILL, OREGON

RAKE ATTACHMENT FOR HOES

Application filed June 25, 1929. Serial No. 373,528.

My invention relates to rake attachments for hoes and has for its principal object to provide means whereby a set of rake teeth may be easily and quickly secured in operative position upon a garden tool such as a hoe and arranged in such a position whereby the teeth of the rake will not interfere with the operation of the blade of the hoe.

A further object of the invention is to provide a simple and inexpensive attachment by means of which one form of garden tool such as a hoe may be converted for use as a rake.

Other objects and advantages reside in the special construction, combination and arrangement of the various elements forming the invention as more fully hereinafter described and claimed, reference being had to the accompanying drawings forming part hereof, wherein:

Figure 1 is a perspective view showing my rake attachment in operative position upon a hoe, Figure 2 is a plan view of the rake attachment, Figure 3 is a sectional view through the handle of the tool showing the fastening means for the attachment, and Figure 4 is a fragmentary detail showing a portion of the rake teeth.

Referring now to the drawings I have shown my invention comprising a rake attachment for garden tools such as for instance, a hoe having a handle 5 and a hoe blade 6 attached thereto by a handle socket 7. My invention comprises a rake attachment for said tool having a substantially triangular shaped frame 8 with one section thereof indicated at 9 arranged along the back upper edge of the hoe blade 6. Intermediate the ends of the section 9 is formed an offset section 10 designed to fit over the shank 11 connecting the hoe blade with the socket.

Teeth 12 are integrally formed on the section 9 arranged to extend upwardly beyond the upper edge of the hoe blade 6 with the base of said teeth indicated at 13 extending at the opposite side of the section 9 and adapted to abut against the blade of the hoe in a manner to brace the teeth thereagainst. By placing the lower ends of the teeth against the rear face of the hoe blade the rake is prevented from slipping forwardly beyond the hoe blade during the raking action. The offset portion 10 of the frame abuts the upwardly bent shank 11 of the hoe to prevent slipping rearwardly.

The side members of the frame 8 converge rearwardly and are connected by a transverse rod 14 curved in conformity with the socket 7 against which the rod 14 is arranged to rest.

The side members of the frame extend rearwardly from the rod 14 in substantially parallel relation in the form of a pair of arms 15 and connected at the rear ends thereof by a transverse rod 16 curved similarly to the rod 14. The rods 14 and 16 form a saddle within which the handle 5 and socket 7 is adapted to rest.

Near the rear end of the arms 15 is arranged a snap fastener 17 comprising an arcuate spring-pressed arm pivotally connected at 18 with one of the arms 15 and adapted to partially encircle the handle 5 at the opposite side from the rod 16 and having its free end provided with a catch 19 adapted to be snapped in position upon the opposite arm 15 from its pivotal connection.

It is apparent from the foregoing that the rake attachment may be easily and quickly connected to the handle of the hoe by releasing the catch 19 and seating the handle within the saddle formed by the rods 14 and 16. The fastener is then swung across the opposite side of the handle and snapped into position whereby the handle is substantially embraced between the fastener and the saddle. The tool is then adapted for use either as a hoe or rake.

It is obvious that the invention is susceptible to various changes and modifications without departing from the spirit thereof or the scope of the appended claims and I accordingly claim all such forms of the device to which I am entitled.

I claim:

1. An attachment for garden tools of the type having a handle and a blade, said attachment comprising a rake frame formed of a continuous strip of material, teeth carried at one end thereof and having their butt ends engaging the blade of the tool to secure the teeth against displacement during the raking action, a handle saddle arranged at the opposite end of the frame and a fastening device coacting with the frame whereby to embrace said handle.

2. A rake attachment for garden tools comprising in combination, a blade having an upwardly bent shank for attaching to a tool handle, a rake frame formed of a continuous strip of material having a plurality of teeth at one end thereof, said teeth having their butt ends supported against the rear face of the blade and said frame extending transversely in front of the bent portion of the shank whereby to secure the frame against longitudinal movement during the raking action, a saddle carried by the frame for the handle and a snap fastener cooperating with the saddle to encircle the handle for releasably securing the frame thereto.

In testimony whereof I affix my signature.

CHARLES COPPOCK.